(12) United States Patent
Ouyang et al.

(10) Patent No.: US 10,338,453 B2
(45) Date of Patent: Jul. 2, 2019

(54) PHOTONIC CRYSTAL ALL-OPTICAL MULTISTEP-DELAY SELF-AND-TRANSFORMATION LOGIC GATE

(71) Applicant: Zhengbiao Ouyang, Shenzhen, Guangdong (CN)

(72) Inventors: Zhengbiao Ouyang, Guangdong (CN); Quanqiang Yu, Guangdong (CN)

(73) Assignee: Zhengbaio Ouyang, Shenzhen (CN)

( * ) Notice: Subject to any disclaimer, the term of this patent is extended or adjusted under 35 U.S.C. 154(b) by 0 days.

(21) Appl. No.: 15/626,228

(22) Filed: Jun. 19, 2017

(65) Prior Publication Data

US 2017/0307960 A1 Oct. 26, 2017

Related U.S. Application Data

(63) Continuation of application No. PCT/CN2015/097851, filed on Dec. 18, 2015.

(30) Foreign Application Priority Data

Dec. 19, 2014 (CN) .......................... 2014 1 0796539

(51) Int. Cl.
*G02F 1/365* (2006.01)
*G02F 1/35* (2006.01)
*G02F 3/00* (2006.01)
*G02B 6/122* (2006.01)
*G02B 6/125* (2006.01)
*G02B 6/12* (2006.01)

(52) U.S. Cl.
CPC ............. *G02F 1/365* (2013.01); *G02B 6/125* (2013.01); *G02B 6/1225* (2013.01); *G02F 1/35* (2013.01); *G02F 3/00* (2013.01); *G02B 2006/1213* (2013.01)

(58) Field of Classification Search
CPC .................. G02B 6/1225; G02B 6/125; G02B 2006/1213; G02F 1/35; G02F 1/365; G02F 3/00; G02F 3/02; G02F 3/024; G02F 3/028; B82Y 20/00; G06E 1/00; G06E 1/02; H03K 19/14
See application file for complete search history.

(56) References Cited

U.S. PATENT DOCUMENTS

2017/0307823 A1* 10/2017 Ouyang ................... G02F 3/00

* cited by examiner

*Primary Examiner* — Stephone B Allen
*Assistant Examiner* — Adam W Booher
(74) *Attorney, Agent, or Firm* — Zhihua Han

(57) ABSTRACT

A PhC all-optical multistep-delay self-AND-transformation logic gate comprising PhC structure unit, an optical switch unit, a memory or delayer, a wave absorbing load, a D-type flip-flop unit and a NOT logic gate; an logic-signal is connected with the input port of a two-branch waveguide whose two output ports are respectively connected with the memory input port and the logic-signal input port of the optical switch unit; two intermediate-signal output port of the optical switch unit are respectively connected with the intermediate-signal input port of the PhC structure unit and said wave absorbing load; a clock-signal CP is connected with the input port of a three-branch waveguide whose three output ports are respectively connected with the NOT logic-gate input port, the first clock-signal input port of the PhC structure unit, and the second clock-signal input port of the optical switch unit.

13 Claims, 3 Drawing Sheets

| A | B | C | Y |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 0 |
| 1 | 1 | 0 | 1 |
| 1 | 1 | 1 | 1 |

FIG. 4

PHOTONIC CRYSTAL ALL-OPTICAL MULTISTEP-DELAY SELF-AND-TRANSFORMATION LOGIC GATE

CROSS-REFERENCE TO RELATED APPLICATION

This application is a continuation application of PCT Application No. PCT/CN2015/097851 filed on Dec. 18, 2015 which claims priority to Chinese Application No. 201410796539.2 filed on Dec. 19, 2014, the entire contents of which are hereby incorporated by reference.

FIELD OF THE INVENTION

The present invention relates generally to two-dimensional (2D) photonic crystal (PhC) optical AND logic gates.

BACKGROUND OF THE INVENTION

In 1987, the concept of photonic crystal (PhC) was proposed separately by E. Yablonovitch from United States Bell Labs who discussed how to suppress spontaneous radiation and by S. John from Princeton University who made discussions about photonic localization. A PhC is a material structure in which dielectric materials are arranged periodically in space, and is usually an artificial crystal consisting of two or more materials having different dielectric constants.

With the emergence of and in-depth research on PhC, people can control the motion of photons in a PhC material more flexibly and effectively. In combination with traditional semiconductor processes and integrated circuit technologies, design and manufacture of PhC and devices thereof have continually and rapidly marched towards all-optical processing, and PhC has become a breakthrough for photonic integration. in December 1999, PhC was recognized by the American influential magazine Science as one of the top-ten scientific advances in 1999, and therefore has become a hot topic in today's scientific research field.

An all-optical logic device mainly includes an optical amplifier-based logic device, a non-linear loop mirror logic device, a Sagnac interference type logic device, a ring cavity logic device, a multi-mode interference logic device, an optical waveguide coupled logic device, a photoisomerized logic device, a polarization. switch optical logic device, a transmission grating optical logic device, etc. These optical logic devices have the common shortcoming of large size in developing large-scale integrated optical circuits. With the improvement of science and technology in recent years, people have also done research and developed quantum optical logic devices, nano material optical logic devices and PhC optical logic devices, which all conform to the dimensional requirement of large-scale photonic integrated optical circuits. For modern manufacturing processes, however, the quantum optical logic devices and the nano material optical logic devices are very difficult to be manufactured, whereas the PhC optical logic devices have competitive advantages in terms of manufacturing process.

In recent years, PhC logic devices have become a hot area of research drawing widespread attentions, and it is highly likely for them to replace the current widely-applied electronic logic devices in the near future. The PhC logic device can directly realize gill-optical logical functions, such as "AND", "OR", "NOT" and the like, and is a core device for realizing all-optical computing. In the process of realizing all-optical computing, PhC logical function devices based on "AND". "OR", "NOT", "XOR" and the like have been successfully designed and researched, and various complex logic components are still needed for achieving the goal of all-optical computing.

SUMMARY OF THE INVENTION

The present invention is aimed at overcoming the defects of the prior art and providing a PhC all-optical multistep-delay self-AND-transformation logic gate which is compact in structure, strong in anti-interference capability and easy to integrate with other optical logic elements.

The technical solution proposal adopted by the invention to solve the technical problem is as follows:

The PhC all-optical multistep-delay self-AND-transformation logic gate in the present invention includes a PhC structure unit, an optical switch unit, a memory or delayer, a wave absorbing load, a D-type flip-flop unit and a NOT logic gate; a logic signal X is connected with the input port of a two-branch waveguide, and two output ports of the two-branch waveguide are respectively connected with the memory input port and the logic-signal input port of the optical switch unit; the output port of the memory is connected with the delay-signal input port of the optical switch unit; two intermediate-signal output port of the optical switch unit are respectively connected with the intermediate-signal input port of the PhC structure unit and the wave absorbing load; a clock-signal CP is connected with the input port of a three-branch wave guide, and the three output ports of the three-branch waveguide are respectively connected with the NOT logic gate input port, the first clock-signal input port of the PhC structure unit, and the second clock-signal input port of the optical switch unit; the NOT logic-gate output port is connected with the third clock-signal input port of the D-type flip-flop unit; the signal output port of the PhC structure unit is connected with the D-signal input port of the D-type flip-flop unit.

The PhC structure unit is a 2D-PhC cross intersected waveguide nonlinear cavity and is a 2D-PhC cross-waveguide four-port network formed by high-refractive-index dielectric pillars, a left port of the four-port network is clock-signal input port, a lower port is the intermediate-signal input port, an upper port is the signal output port, and a right port is an idle port; two mutually-orthogonal quasi-ID PhC structures are placed in two waveguide directions crossed at a center of the cross waveguide, a dielectric pillar is arranged in a middle of the cross waveguide, a dielectric pillar is made of a nonlinear material, the cross section of the dielectric pillar is square, polygonal, circular or oval, and the dielectric constant of a rectangular linear pillar clinging to the central nonlinear pillar and close to the signal output port is equal to that of the central nonlinear pillar under low-light-power conditions; and the quasi-1D PhC structures and the dielectric pillar constitute a waveguide defect cavity.

The optical switch unit 02 is a 2×2 optical selector switch, and includes a second clock-signal input port, a delay-signal input port, a logic-signal input port and two intermediate-signal output ports; the two intermediate-signal output ports are respectively the first and second intermediate-signal output ports.

The memory includes an input port and an output port; the output-signal of the memory has the input-signal input to the memory before k steps; the delayer includes an input port and an output port; the output signal of the delayer has k-step delay relative to the input signal thereof;

The memory or delayer is the one with k-step delay.

The D-type flip-flop unit includes a clock-signal input port, a D-signal input port and a system output port; the input-signal of the D-signal input port of the D-type flip-flop unit is equal to the output-signal at the output port in the PhC structure unit.

The 2D PhC is a (2k+1)×(2k+1) array structure, where k is an integer more than or equal to 3.

The cross section of the high-refractive-index dielectric pillar of the 2DPhC is circular, oval, triangular or polygonal.

A background filling material for the 2D PhC is air or a different low-refractive-index medium with a refractive index less than 1.4.

The refractive index of said the dielectric pillar in the quasi-1D PhC of the cross-waveguide is 3.4 or a different value more than 2, and the cross section of the dielectric pillar in the quasi-1D PhC is rectangular, polygonal, circular or oval.

Compared with the prior art, the present invention has the following advantages:

1. Compact in structure, and ease of manufacture;
2. Strong anti-interference capability, and ease of integration with other optical logic elements; and
3. High contrast of high and low logic outputs, and fast operation.

These and other objects and advantages of the present invention will become readily apparent to those skilled in the art upon reading the following detailed description and claims and by referring to the accompanying drawings.

BRIEF DESCRIPTION OF THE DRAWINGS

In FIG. 1, the indications are: PhC structure unit 01, first clock-signal input port 11, intermediate-signal input port 12, idle port 13 signal output port 14, circular high-refractive-index linear-dielectric pillar 15, first rectangular high-refractive-index rectangular high-refractive-index linear-dielectric pillar 16, second rectangular high-refractive-index linear-dielectric pillar 17, nonlinear-dielectric pillar 18, clock-signal CP, logic-signal X, optical switch unit 02, delay-signal input port 21, logic-signal input port 22, first intermediate--signal output port 23, second intermediate-signal output port 24, second clock-signal input port, memory or delayer 03, wave absorbing load 04, D-type flip-flop unit 05, third clock-signal input port 51, D-signal input port 52, system output port 53, NOT logic gate 06.

FIG. 4 is a truth table of the logic functions of a 2D-PhC cross-waveguide nonlinear cavity shown in FIG. 1.

The present invention is more specifically described in the following paragraphs by reference to the drawings attached only by way of example.

DETAILED DESCRIPTION OF THE INVENTION

The terms a or an, as used herein, are defined as one or more than one, the term plurality, as used herein, is defined as two or more than two, and the term another, as used herein, is defined as at least a second or more.

Figure 1:
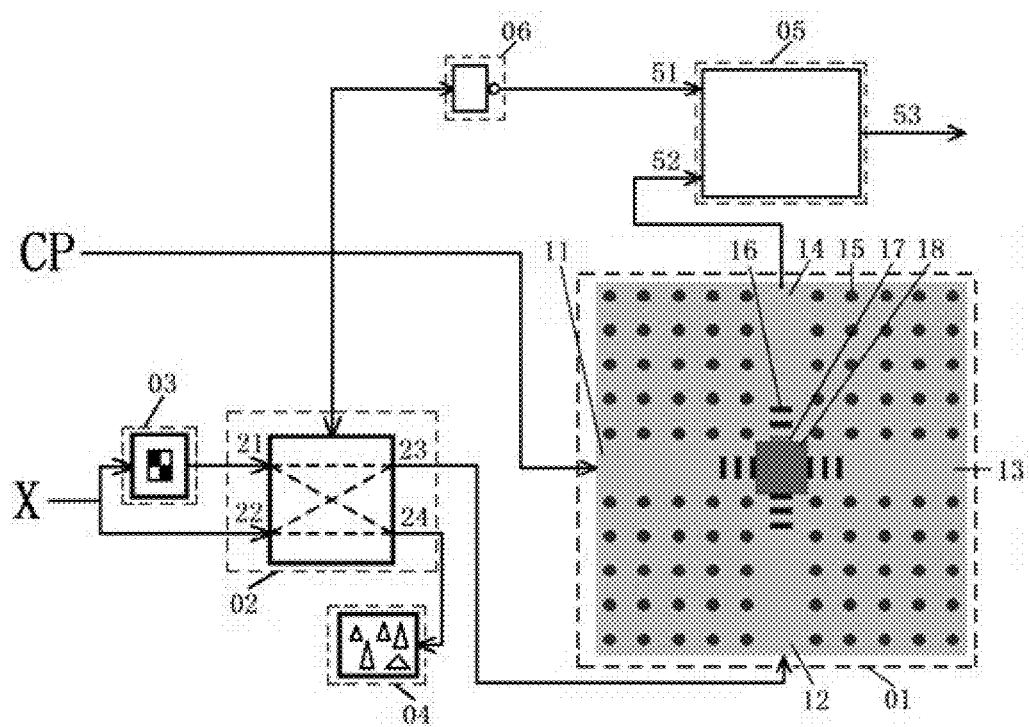
FIG. 1 is a structural schematic diagram of a PhC all-optical multistep self-AND-transformation logic gate of the present invention.

As shown in FIG. 1, the PhC all-optical multistep-delay self-AND-transformation logic gate of the present invention includes a PhC structure unit 01, an optical switch unit 02, a memory or delayer 03, a wave absorbing load 04, a D-type flip-flop unit 05 and a NOT logic gate 06; the PhC structure unit 02 is a 2D-PhC cross-waveguide nonlinear cavity and is arranged behind the optical switch unit, the background filling material for the 2D PhC is air or a different low-refractive-index medium with a refractive index less than 1.4, the cross section of the high-refractive-index dielectric pillar of the 2D PhC is circular, oval, triangular or polygonal, the 2D-PhC cross-waveguide nonlinear cavity is a2D-PhC cross-waveguide four-port network formed by high-refractive-index dielectric pillars, the four-port network has a four-port PhC structure, the left port is clock-signal input port, the lower port is a second intermediate-signal input port, the upper port is a signal output port, and the right port is an idle port; two mutually-orthogonal quasi-1D PhC structures are placed in two waveguide directions crossed at the center of the cross waveguide, the cross section of the dielectric pillar in the quasi-1D PhC is rectangular, polygonal, circular or oval, the refractive index of the dielectric pillar is 3.4 or a different value more than 2, a dielectric pillar is arranged in the middle of the cross waveguide, the dielectric pillar is made of a nonlinear material, the cross section of the dielectric pillar is square, polygonal, circular or oval, and the quasi-1D PhC structures and the dielectric pillar constitute a waveguide defect cavity. The lattice constant of the 2D-PhC array is d, and the array number is 11×11; the circular high-refractive-index linear-dielectric pillar 25 is made of a silicon (Si) material, and has a refractive index of 3.4 and a radius of 0.18 d; the first rectangular high-refractive-index linear-dielectric pillar 26 has a refractive index of 3.4, long sides of 0.613 d and short sides of 0.162 d; the second rectangular high-refractive-index linear-dielectric pillar 27 has a dielectric constant being the same as that of a nonlinear-dielectric pillar under low-light-power conditions, and has a dimension equal to that of the first rectangular high-refractive-index linear-dielectric pillar 26; and the central square nonlinear-dielectric pillar 28 is made of a Kerr type nonlinear material, and has a side length of 1.5 d, a dielectric constant of 7.9 under low-light-power conditions and a third-order nonlinear coefficient of $1.33 \times 1.0^{-2} \mu m^2 / V^2$. Twelve rectangular high-refractive-index linear-dielectric pillars and one square nonlinear-dielectric pillar are arranged in the center of the 2D-PhC cross-waveguide nonlinear cavity in the form of a quasi-1D PhC along longitudinal and transverse waveguide directions, the central nonlinear-dielectric pillar clings to the four adjacent rectangular high-refractive-index linear-dielectric pillars and the distance therebetween is 0, every two adjacent rectangular high-refractive-index linear-dielectric pillars are spaced 0,2668 d from each other, and the dielectric constant of a rectangular linear-pillar clinging to the central nonlinear-pillar and close to the signal output port is equal to that of the central nonlinear-pillar under low-light-power. the optical switch unit 02 is a 2×2 optical selector switch controlled by a clock-signal CP, used for controlling and selecting a logic-signal for outputting, and includes a second clock-signal input port, a delay-signal input port, a logic-signal input port and two intermediate-signal output ports; the memory or delayer 04 includes an input port and an output port; a logic-signal X is input via the input port of a two-branch waveguide, one port of the output of the two-branch waveguide is connected with a memory 03, the another port of the memory 03 directly outputs a delay-signal X(n−k) to the delay-signal input port 21 in the optical selector switch, the memory or delayer is the one of k-step delay; the delayer includes an input port and an output port; the memory or delayer is the one with k-step delay, and is arranged between the input port of the system and the optical switch unit, the memory stores and outputs an input-signal X (n−k) arrived before k steps of the signal X; the output signal of the delayer has k-step delay relative to the input-signal thereof; and the other port of the memory directly inputs the logic-signal X(n) to the logic-signal input port 22 of the optical selector switch, the first intermediate-signal output port 23 of the optical selector switch 02 is connected with the intermediate-signal input port 12 of the PhC structure unit 01, the second intermediate-signal output port 24 of the optical selector switch 02 is connected with the wave absorbing load 04, and the wave absorbing load is used for absorbing light wave entering it; a clock-signal CP is input through the input port of a three-branch waveguide, the first output port of the three-branch waveguide connected with the input port of the NOT logic gate 06, the second output port of the three-branch waveguide is connected with the first clock-signal input port 11 of the PhC structure unit 01 and the third output port of the three-branch waveguide is connected with the second lock-signal input port of the optical switch unit 02, and the output port of the NOT logic gate 06 is connected with the third clock-signal input port 51 of the D-type flip-flop unit 05; NOT logic gate 06 is arranged between the clock-signal CP input port and the D-type flip-flop unit 05, and is used for performing NOT logic operation on the input signal; the input-signal and the further projecting to the clock-signal input port 51 of the D-type flip-flop unit 05; the D-type flip-flop unit 05 includes a clock-signal input port, a D-signal input port and a system output port; the signal output port 14 of the PhC structure unit 01 is connected with the D-signal input port 52 of the D-type flip-flop unit 05 i.e., the input-signal of the D-signal input port of the D-type flip-flop unit 05 is equal to the output-signal of the output port of the PhC structure unit 01; the system signal output port 53 of the D-type flip-flop unit 05 is the system output port of the PhC all-optical multistep-delay self-AND-transformation logic gate of the present invention.

The present invention can realize a self-AND-transformation logic gate function and a multistep-delay self-AND-transformation logic gate function of all-optical logic-signals under the cooperation of unit devices such as the optical switch, based on the photonic bandgap (PBG) characteristic, quasi-1D PhC defect state, tunneling effect and optical Kerr nonlinear effect of the 2D-PhC cross-waveguide nonlinear cavity shown in FIG. 1. Introduced first is the basic principle of the PhC nonlinear cavity in the present invention: a 2D PhC provides a PBG with a certain bandwidth, a light wave with its wavelength falling into this bandgap can be propagated in an optical circuit designed inside the PhC, and the operating wavelength of the device is thus set to certain wavelength in the PBG; the quasi-1D PhC structure arranged in the center of the cross-waveguide and the nonlinear effect of the central nonlinear-dielectric pillar together provide a defect state mode, which, as the input light wave reaches a certain light intensity, shifts to the operating frequency of the system, so that the structure produces the tunneling effect and signals are output from the output port 14.

Figure 2:
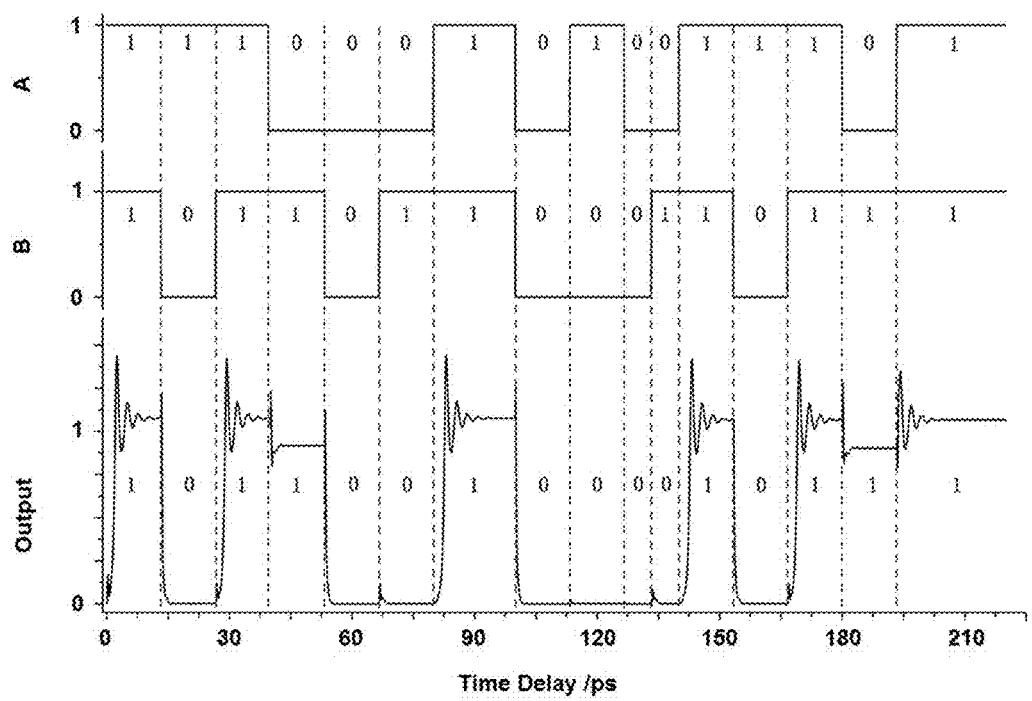
FIG. 2 is a waveform diagram of the basic logic functions of a PhC structure unit shown in FIG. 1 for the lattice constant d of 1 μm and the operating wavelength of 2.976 μm.

For the lattice constant d of 1 μm and the operating wavelength of 2.976 μm, referring to the 2D-PhC cross-waveguide nonlinear cavity shown by PhC structure unit 01 of FIG. 1, and for a signal A input from the port 11 and a signal B input from the port 12 as indicated by the upper two diagrams in FIG. 2, a logic output waveform diagram of the 2D-PhC cross-waveguide nonlinear cavity of the present invention can be obtained, as displayed by the logic output waveforms at the lower part of FIG. 2. A logic operation truth table of the PhC structure shown in FIG. 4 can be obtained according to the logic operation characteristic shown in FIG. 2. In FIG. 4, C is a current state $Q^n$, and Y is the signal output at the output port 14 of the PhC structure unit 01—the next state $Q^{n+1}$. A logic expression of the structure can be obtained according to the truth table:

$$Y=AB+BC \quad (1)$$

That is $$Q^{n+1}=AB+BQ^n \quad (2)$$

According to the basic logic operation characteristic of the above 2D-PhC cross-waveguide nonlinear cavity, the logic output of the previous step serves as a logic input to the nonlinear cavity itself to realize logic functions.

As shown in FIG. 1, for CP=1, the optical selector switch turns the input-signal X(n−k) of the delay logic-signal input port 21 to the first intermediate-signal output port 23 of the optical selector switch, and the input-signal X(n−k) is further projected to the intermediate-signal input port 12 of the PhC structure unit 01, i.e., the input-signal at the intermediate-signal input port 12 of the PhC structure unit 02 is equal to the input-signal X(n−k) at the delay logic-signal input port 21; simultaneously, the optical selector switch turns the logic-signal X(n) at the logic-signal input port 22 to the second intermediate-signal output port 24 of the optical selector switch, and the logic-signal X(n) is further projected to the wave absorbing load 04.

For CP=0, the optical selector switch turns the input-signal X(n−k+1) at the delay logic-signal input port 21 to second intermediate-signal output port 24 of the optical selector switch, and the input-signal X(n−k+1) is further projected to the wave absorbing load 04; simultaneously, the optical selector switch turns the logic-signal X(n+1) at the logic-signal input port 22 to the first intermediate-signal output port 23 of the optical selector switch, and the logic-signal X(n+1) is further projected to the intermediate-signal input port 12 of the PhC structure unit 01, i.e., the input-signal of the intermediate-signal input port 12 of the PhC structure unit 01 is equal to the logic-signal X(n+1) at the logic-signal input port 22.

With the cooperation described above, the multistep-delay self-AND-transformation logic function of all-optical logic-signals can be realized.

The PhC structure of the device in the present invention can be of a (2k+1)×(2k+1) array structure, where k is an integer more than or equal to 3. Design and simulation results will be provided below in an embodiment given in combination with the accompanying drawings, wherein the embodiment is exemplified by an 11×11 array structure and a lattice constant d of 0.5208 μm.

The optical selector switch operates as follows under the control of a clock-signal CP:

At a moment $t_n$, CP is made equal to 1, the optical selector switch turns the delay-signal X(n−k) at the delay-signal input port 21 to the second intermediate-signal output port 23, and the delay-signal X(n−k) is further projected to the intermediate-signal input port 12 of the PhC structure unit 01; and the optical selector switch turns the signal X(n) at the logic-signal input port 22 to the second intermediate-signal output port 24, and the signal X(n) is further projected to the wave absorbing load 04; simultaneously, the input signal at the clock-signal input port. of the PhC structure unit 01 is synchronized with the clock-signal CP, i.e., A=CP=1. The output at the port 14 at this moment can be obtained from the expression (2):

$$Q^{n+1}=X(n-k) \quad (3)$$

At a moment $t_{n+1}$, CP is made equal to 0, the optical selector switch transmits the delay-signal at the delay-signal input port 21 to the second intermediate-signal output port 24, and the delay-signal is further projected to the wave absorbing load 04; the optical selector switch turns the signal X(n+1) at the logic-signal input port 22 to the first intermediate-signal output port 23, and the signal X(n+1) is further projected to the intermediate-signal input port 12 of the PhC structure unit 01; and simultaneously, the clock-signal input port of the PhC structure unit 01 is synchronized with the clock-signal CP , i.e., A=CP=0. The output at the port 14 at this moment can be obtained from the expression (2):

$$Q^{n+1}=X(n+1)\,X(n-k) \quad (4)$$

The output at the output port 14 of the PhC structure unit 01 is equal to the input at the D-signal input port 52 of the D-type flip-flop unit 05, and it can be obtained from the expressions (3) and (4) that the input-signal D at the D-signal input port 52 is X(n−k) for CP=1 and is X(n+1)X(n−k) for CP=0.

Because the clock-signal input port 51 of the D-type flip-flop unit 05 is connected with the output port of the NOT logic gate 06, the system output of the D-type flip-flop unit 05 follows the input-signal D for CP=0; and for CP=1, the system output keeps the input-signal D at the previous moment. Thus, it can be known that the output $Q^{n+1}$ at the system output port 53 of the device in the present invention is $Q^{n+1}$=D=X(n+1) X(n−k) for CP=0; and at a next moment for CP=1, the system output keeps the output at the previous moment, i.e., the system output in a clock cycle is:

$$Q^{n+1}=X(n+1)\,X(n-k) \quad (5)$$

Hence, the device in the present invention can realize the multistep-delay self-AND-transformation logic function of logic-signals. If the memory is changed into a k-step delayer, the same function can be realized.

For the operating wavelength of 1.55 µm in the device and the lattice constant d of 0.5208 µm for the PhC structure unit, the radius of the circular high-refractive-index linear-dielectric pillar 15 is 0.0937441 µm; the long sides of the first rectangular high-refractive-index linear-dielectric pillar 16 are 0.3192504 µm, and the short sides are 0.0843696 m, the size of the second rectangular high-refractive-index linear-dielectric pillar 17 is the same as that of the first rectangular high-refractive-index linear-dielectric pillar 16, the side length of the central square nonlinear-dielectric pillar 18 is 0.7812 m, the third-order nonlinear coefficient is 1.33×10−2∞m²/V², and the distance between every two adjacent rectangular linear-dielectric pillars is 0.13894944 µm. Based on the above dimensional parameters, for the delay-signal X(n−k) at the delay-signal input port 21 of the optical selector switch and the signal X(n) at the logic-signal port 12 are input according to the waveforms shown in FIG. 2, a system output waveform diagram at the lower part in FIG. 2 can be obtained under the control of the clock-signal CP. Hence, the system carries out AND-logic operation on the logic input quantity X(n+1) and the logic input quantity X(n−k) at the previous moment. That is, the multistep-delay, self-AND-transformation logic function of logic-signals is realized.

Figure 3:
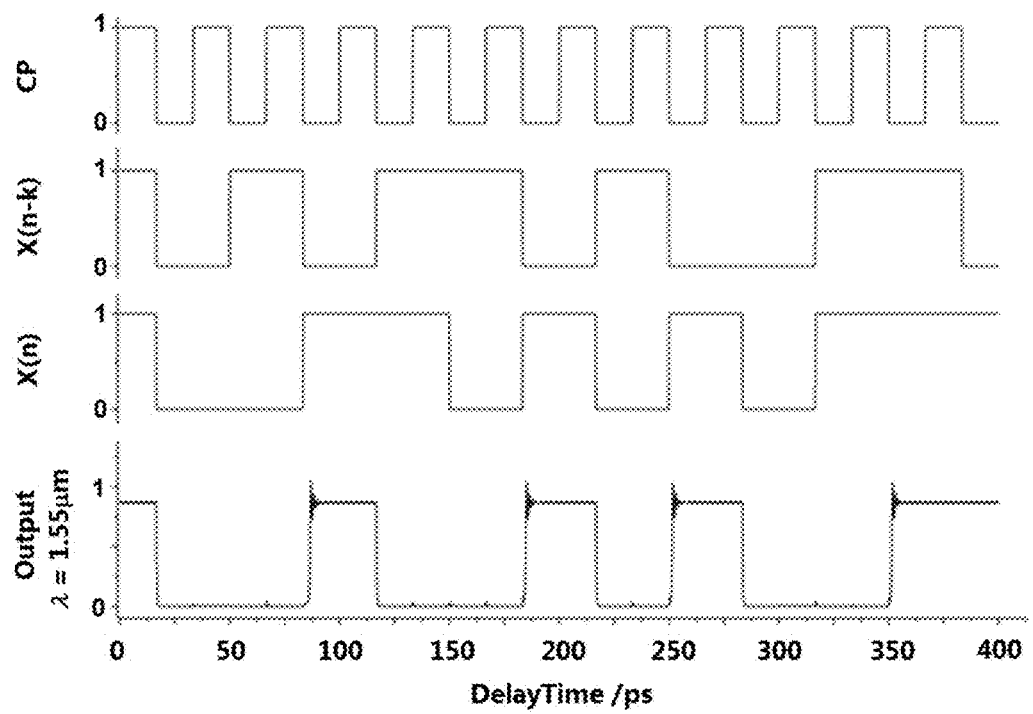
FIG. 3 is a waveform diagram of the logic-signal multi-step-delay self-AND-transformation logic function of the photonic crystal all-optical multistep-delay self-AND logic gate of the present invention for the lattice constant dof0.5208 μm and the operating wavelength of 1.55 μm.

With reference to FIG. 3, the device in the present invention can realize the same logic function under different lattice constants and corresponding operating wave lengths by scaling.

To sum up, a multistep-delay self-AND-transformation logic gate function of all-optical logic-signals can be realized under the coordination of the NOT logic gate and the D-type flip-flop unit by adding a memory or delayer, an optical switch unit and a wave absorbing load via the control of the clock-signal CP.

In the logic-signal processing in an integrated optical circuit, self-convolution operation of a single logic-signal can be defined, and the above-mentioned self-AND logic operation of logic-signals is a basic operation for the self-convolution operation of logic-signals. The self-AND-transformation logic function of logic-signals realized in the present invention plays an important role in realizing self-correlation transformation or self-convolution operation of logic variables.

While the invention has been described in terms of various specific embodiments, those skilled in the art will recognize that the invention can be practiced with modification within the spirit and scope of the claims.

What is claimed is:

1. A photonic crystal (PhC) all-optical multistep-delay self-AND-transformation logic gate, comprising:
    a PhC structure unit, an optical switch unit, a memory or delayer, a wave absorbing load, a D-type flip-flop unit and a NOT logic gate; a logic-signal (X) is connected with an input port of a two-branch waveguide, and two output ports of the two-branch waveguide are respectively connected with a memory input port and a logic-signal input port of said optical switch unit; an output port of said memory is connected with a delay-signal input port of the optical switch unit; two intermediate-signal output ports of said optical switch unit are respectively connected with an intermediate-signal input port of said PhC structure unit and said wave absorbing load; a clock-signal (CP) is connected with an input port of a three-branch waveguide, and three output ports of a three-branch waveguide are respectively connected with a NOT logic gate input port, a first clock-signal input port of said PhC structure unit, and a second clock-signal input port of said optical switch unit;
    a NOT logic gate output port is connected with a third clock-signal input port of said D-type flip-flop unit; a signal output port of said PhC structure unit is connected with a D-signal input port of said D-type unit.

2. The PhC all-optical multistep-delay self-AND-transformation logic gate of claim 1, wherein said PhC structure unit is a two-dimensional photonic crystal (2D-PhC) cross-waveguide nonlinear cavity and is a cross 2D-PhC cross-waveguide four-port network formed by high-refractive-index linear dielectric pillars, a left port of a four-port is clock-signal input port, a lower port is the intermediate-signal input port, an upper port is the signal output port, and a right port is an idle port; two mutually-orthogonal quasi-one dimensional (quasi-1D) PhC structures are placed in two waveguide directions crossed at a center of the cross-waveguide, a nonlinear dielectric pillar is arranged in the center of the cross-waveguide and is made of a nonlinear material, a cross section of the nonlinear dielectric pillar is square, polygonal, circular, or oval; and a dielectric constant of a rectangular linear dielectric pillar clinging to the nonlinear dielectric pillar and close to the signal output port is equal to that of the nonlinear dielectric pillar under lowlight-power; and said quasi-1D PhC structures and said dielectric pillar nonlinear dielectric pillar constitute a waveguide defect cavity.

3. The PhC all-optical multistep-delay self-AND-transformation logic gate of claim 2, wherein the 2D PhC is a (2k+1)×(2k+1) array structure, where k is an integer more than or equal to 3.

4. The PhC all-optical multistep-delay self-AND-transformation logic gate of claim 2, wherein a cross section of the high-refractive-index linear dielectric pillar of 2D-PhC is circular, oval, triangular, or polygonal.

5. The PhC all-optical multistep-delay self-AND-transformation logic gate of claim 2, wherein a background filling material for the 2D-PhC is a low-refractive-index dielectric having a refractive index of less than 1.4.

6. The PhC all-optical multistep-delay self-AND-transformation logic gate of claim 2, wherein a background filling material for the 2D-PhC is air.

7. The PhC all-optical multistep-delay self-AND-transformation logic gate of claim 2, wherein the refractive index of the dielectric pillar in the quasi-1D PhC of the cross-waveguide is greater than 2.

8. The PhC all-optical multistep-delay self-AND-transformation logic gate of claim 2, wherein the refractive index of the dielectric pillar in the quasi-1D PhC of the cross-waveguide is 3.4.

9. The PhC all-optical multistep-delay self-AND-transformation logic gate of claim 2, wherein a cross section of the dielectric pillar in the quasi-1D PhC is rectangular, polygonal, circular, or oval.

10. The PhC all-optical multistep-delay self-AND-transformation logic gate of claim 1, wherein said optical switch unit is a 2×2 optical selector switch, and includes a second clock-signal input port, a delay-signal input port, a logic-signal input port and two intermediate-signal output ports; said two intermediate-signal output ports are respectively said first and second intermediate-signal output ports.

11. The PhC all-optical multistep-delay self-AND-transformation logic gate of claim 1, wherein said memory includes an input port and an output port; the output signal of the memory is the input signal input to the memory before k steps; the delayer includes an input port and an output port; the output signal of the delayer has k-step delay relative to the input signal thereof.

12. The PhC all-optical multistep-delay self-AND-transformation logic gate of claim 1, wherein the memory or delayer provides one of k-step delay.

13. The PhC all-optical multistep-delay self-AND-transformation logic gate of claim 1, wherein said D-type flip-flop includes a clock-signal input port, a D-signal input port and a system output port; the input signal at the D-signal input port in said D-type flip-flop unit is equal to the output signal at the output port in said PhC structure unit.

* * * * *